J. P. SMITH.
Corn Sheller.
No. 11,913. Patented Nov. 7, 1854.
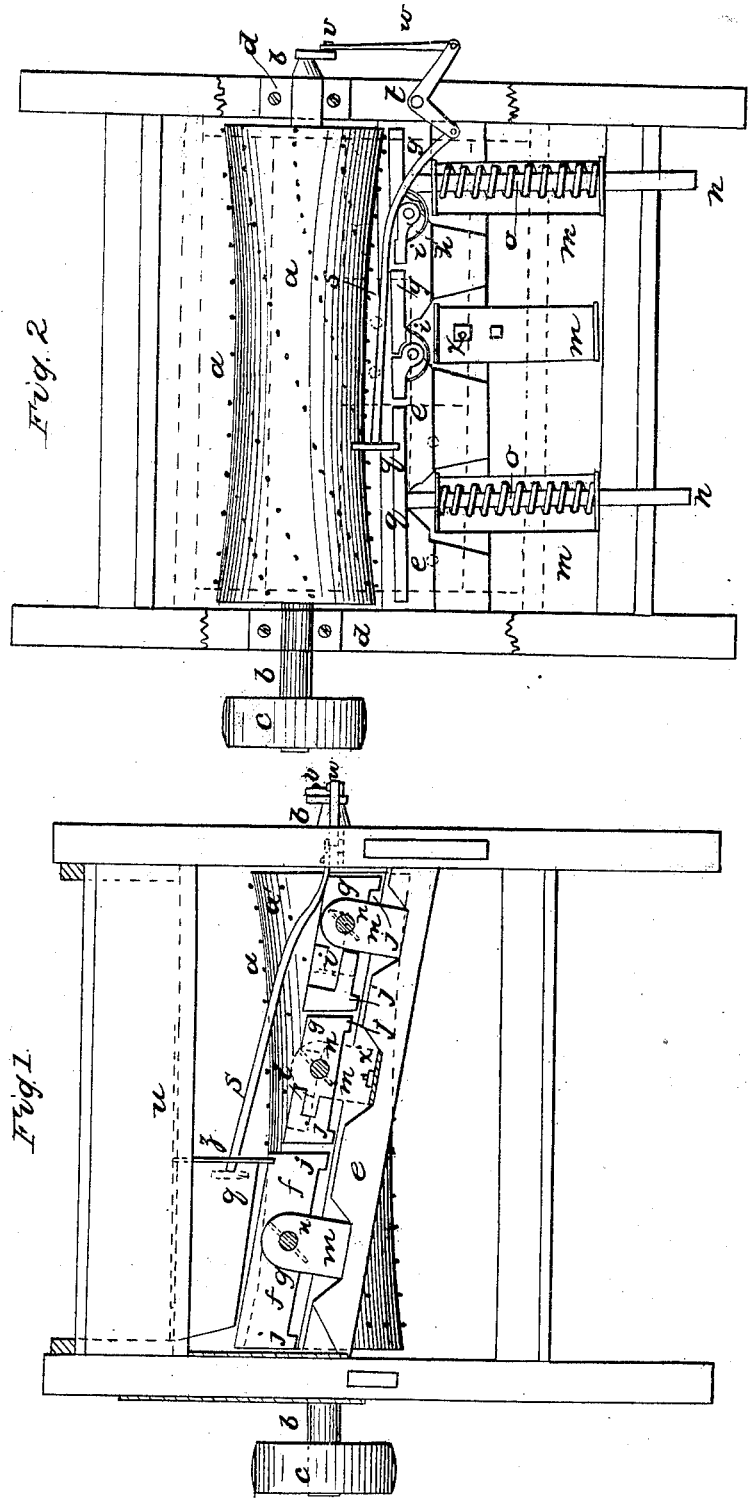

UNITED STATES PATENT OFFICE.

JEREMIAH P. SMITH, OF HUMMELSTOWN, PENNSYLVANIA.

CORN-SHELLER.

Specification of Letters Patent No. 11,913, dated November 7, 1854.

*To all whom it may concern:*

Be it known that I, JEREMIAH P. SMITH, of Hummelstown, in the county of Dauphin in the State of Pennsylvania, have invented a new and useful Improvement in Corn-Shellers; and I do hereby declare that the following is a full and exact description thereof, reference being had to the accompanying drawings, and to the letters of reference marked thereon.

To enable others skilled in the art to make and use my invention, I will proceed to describe its construction and operation, Figure 1 being a side view, Fig. 2 a top view.

I do not limit myself to any particular size of my sheller; 1st is the cylinder $a\ a$ which is concave and armed with spiral rows of teeth to discharge the cobs, the cylinder may be constructed either of wood or iron, the shaft $b\ b\ b\ b$ runs through the cylinder $a\ a$, and rests on bearing $d\ d$, the pulley $c\ c$ is to propel the cylinder, the breast beam $e\ e$ lying in juxtaposition with the cylinder, the shelling bars $g\ g\ g\ g\ g\ g$ the 1st bar at the feeding end is plain, the 2nd and 3rd are in joints, on the hinge principle on the upper ends toward the feeder the springs $i\ i\ i\ i$ are to press the hinge or the jointed part of the bars to their proper place, they are so constructed that they cannot be pressed further than parallel with the other part of the bars, those hinge bars I claim as my own invention and deem the device of great importance to facilitate the discharge of the cobs the slides $n\ n\ n\ n\ n$, and the bar are cast in one piece and slide backward and forward in the sliding frames $m\ m\ m\ m\ m\ m$, the spiral springs $o\ o$ are to press the bars up to the cylinder, the shelling bars slide backward and forward on the rests $j\ j\ j\ j\ j\ j$, which rests lie on the breast beam the slide frames $m\ m\ m\ m\ m\ m$, are fastened to the breast beam by the screw $x$, the 2d and 3rd shelling bars are so constructed that when an ear of corn is passing through the 1st bar which will consequently press that bar from one half an inch to an inch back from the cylinder that when the ear enters the hinged part of the bar it will admit it freely, by means of the springs $i\ i\ i\ i$ giving way. Next is the vibrating feeder which slides in the hopper $u$, it derives its motion from the shaft $s,\ s$, which shaft is connected with the triangle $t\ t$ from which triangle runs another shaft $w\ w$ which shaft is connected with the crank $v\ v$ the crank derives its motion from the shaft $b\ b\ b\ b$, this vibrating feeder is so constructed that the corn can be thrown into the machine in any way, for instance the ears go in endwise the quick motion of the cross bar $q\ q$, will throw it lengthwise on the breast beam and will also prevent the machine from choking it by its continual vibration, the corn is fed in the hopper $u$, the cobs slide down the breast beam and are discharged at the lower end of the machine; this machine is equally adapted to hand or horse power by affixing thereto proper gearing, this machine may be constructed with either two or three shelling bars as the builder may see proper, the vibrating feeder to be so constructed that it may be detached at pleasure when not required by those using this machine.

Claim

I do not claim to be the inventor of a concave cylinder as the same has been in use before, nor the coiled springs $o\ o$ and guides $n\ n\ n$, but What I do claim as my own invention and desire to secure by Letters Patent is, 1. The jointed shelling bars $g\ g$ having rests $j\ j$ and springs $i\ i$ in combination with coiled springs $m\ m$ and guides $n\ n\ n$.

2. I also claim the vibrating feeder operating substantially as set forth.

JEREMIAH P. SMITH.

Witnesses:
 JESSE B. HUMMEL,
 SAMUEL MARTIN.